(12) United States Patent
Arellano (10) Patent No.: US 9,896,054 B2
(45) Date of Patent: Feb. 20, 2018

(54) DUAL PURPOSE TEMPORARY CLIP FOR VEHICLE

(71) Applicant: Toyota Motor Engineering & Manufacturing North America, Inc., Erlanger, KY (US)

(72) Inventor: Nora Arellano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 30 days.

(21) Appl. No.: 15/008,703

(22) Filed: Jan. 28, 2016

(65) Prior Publication Data

US 2017/0217398 A1    Aug. 3, 2017

(51) Int. Cl.
*B60R 21/213* (2011.01)
*B60R 21/232* (2011.01)

(52) U.S. Cl.
CPC .......... *B60R 21/213* (2013.01); *B60R 21/232* (2013.01)

(58) Field of Classification Search
CPC ............ B60R 13/0231; B60R 13/0206; B60R 21/213; B60R 21/214
See application file for complete search history.

(56) References Cited

U.S. PATENT DOCUMENTS

| | | | | |
|---|---|---|---|---|
| 6,155,594 | A * | 12/2000 | Ibe | B60R 13/0206 280/728.2 |
| 6,553,615 | B1 * | 4/2003 | Hansen | F16B 5/0241 16/2.1 |
| 6,736,421 | B2 | 5/2004 | Blake, III et al. | |
| 7,100,939 | B2 | 9/2006 | Blake, III et al. | |
| 7,210,886 | B2 * | 5/2007 | Kawai | B60R 21/213 411/182 |
| 7,370,878 | B2 * | 5/2008 | Nakazawa | B60R 21/213 16/2.1 |

(Continued)

FOREIGN PATENT DOCUMENTS

| | | | | |
|---|---|---|---|---|
| JP | 2014054867 A | * | 3/2014 | ........... B60R 21/213 |
| WO | 2014077127 A1 | | 5/2014 | |

OTHER PUBLICATIONS

Kano et al., Installation Structure of Curtain Shield Air Bag Device, JPO, JP 2014-054867 A, English Abstract.*

(Continued)

*Primary Examiner* — James A English
(74) *Attorney, Agent, or Firm* — Christopher G. Darrow; Darrow Mustafa PC (57) ABSTRACT

Clips that can be used to temporarily hold a curtain side airbag (CSA) to a bracket on a vehicle rail are disclosed. The clips can be integrated into the CSA and allow the CSA to be positioned on the brackets temporarily until such time as a more secure means is utilized, such as a threaded fastener. The clips allow access to an opening in the bracket that is configured to receive a fastener that can be used to secure both the grip assist and the CSA to the bracket. The clip thereby allows the CSA to be positioned on the vehicle rail without interfering with the subsequent attachment of a grip assist to the same bracket. The fastener that attaches the grip assist to the bracket also serves to secure the CSA to the bracket. The clip remains attached to the bracket and to the CSA.

19 Claims, 9 Drawing Sheets

(56) References Cited

U.S. PATENT DOCUMENTS

| | | | |
|---|---|---|---|
| 7,661,704 B2* | 2/2010 | Chen | B60R 21/213 |
| | | | 280/728.2 |
| 8,317,246 B2 | 11/2012 | Takeuchi et al. | |
| 8,439,393 B2* | 5/2013 | Glaser | B60R 13/0206 |
| | | | 280/728.2 |
| 8,496,420 B2* | 7/2013 | Aoki | F16B 5/0642 |
| | | | 411/45 |
| 9,663,056 B2* | 5/2017 | Sakurai | B60R 21/213 |
| 2005/0046154 A1* | 3/2005 | Rhea | B60R 21/213 |
| | | | 280/728.2 |
| 2006/0066080 A1* | 3/2006 | Ikeda | B60R 21/213 |
| | | | 280/730.2 |
| 2007/0052220 A1 | 3/2007 | Hidaka | |
| 2007/0063490 A1* | 3/2007 | Minamikawa | B60R 21/201 |
| | | | 280/728.2 |
| 2008/0303251 A1* | 12/2008 | Sato | B60R 13/0206 |
| | | | 280/730.2 |
| 2013/0017033 A1* | 1/2013 | Brown | B60R 19/24 |
| | | | 411/112 |

OTHER PUBLICATIONS

Kano et al., Installation Structure of Curtain Shield Air Bag Device, JPO, JP 2014-054867 A, Machine Translation of Description.*

* cited by examiner

DUAL PURPOSE TEMPORARY CLIP FOR VEHICLE

FIELD

The subject matter described herein relates in general to temporary clips and, more particularly, to a temporary clip for mounting both a curtain side airbag and another component, such as an assist grip, on a vehicle.

BACKGROUND

Modern vehicles commonly have a variety of safety equipment to protect occupants. For example, inflatable restraints can be integrated with vehicle components located in the interior of the vehicle. The inflatable restraint can include an airbag attached to a vehicle rail, such as a curtain side airbag (CSA). In response to an activation event, a sensor can activate an inflator to generate an inflation gas that rapidly inflates an inflatable portion to facilitate protection of an occupant. The CSA can be attached to bracket (s) welded to the vehicle rail.

Vehicles may be equipped with other components that are attached to the vehicle rail, such as a garnish to provide a desired aesthetic appearance or assist grips to aid the ingress and egress of a vehicle user. These other components can be attached to a vehicle rail using brackets welded to the rail. It may be desirable to use/share the same welded bracket on the vehicle rail to attach portions of both the assist grip and the CSA. However, the alignment of both the CSA and the other component on the same bracket can be cumbersome and time consuming.

SUMMARY

This invention relates to clips that can be used to temporarily hold a CSA to a vehicle rail when the mounting location, such as a bracket, is being shared by another vehicle component, such as a grip assist or garnish. The clips can be integrated into the CSA and allow the CSA to be positioned temporarily until such time as a more secure means is utilized, such as a threaded fastener. The clip remains coupled to the vehicle, such as coupled to the bracket, when the more secure means is utilized.

In one respect, the present disclosure is directed to a system for attaching components to a bracket on vehicle side rail. The system includes a fastener, an inflatable restraint, a clip and a bracket. The clip is operatively connected to the restraint and has a retention feature and an opening. The bracket is operatively connected to a vehicle side rail and has an opening and an engagement feature. The retention feature engages with the engagement feature and retains the restraint coupled to the bracket with the openings aligned with one another without the use of the fastener. The fastener is subsequently inserted into the aligned openings and secures the restraint to the bracket along with the clip.

In another respect, the present disclosure is directed to a vehicle. The vehicle includes at least one side rail, an engagement feature, a mounting opening, a vehicle component, a fastener, an inflatable restraint and a clip. The component has an opening. The clip is operatively connected to the restraint and has a retention feature and an opening. The retention feature engages with the engagement feature and retains the restraint operatively coupled to the side rail with the clip and mounting openings aligned with one another without the use of the fastener. The component opening is subsequently aligned with the clip and mounting openings and the fastener is inserted into the aligned openings and secures the component and restraint relative to the side rail along with the clip.

In yet another respect, the present disclosure is directed to a method of attaching multiple components to a bracket on a side rail of a vehicle. The method includes operatively connecting a clip of an inflatable restraint to the bracket with an opening in the clip aligned with an opening in the bracket. The method also includes maintaining the connection of the clip to the bracket without the use of a fastener. The method includes aligning an opening in another vehicle component with the aligned openings in the clip and bracket and inserting a fastener through the aligned openings thereby securing the component, the clip and the restraint to the bracket with the fastener.

DETAILED DESCRIPTION

This detailed description relates to clips that can be used to temporarily hold a curtain side airbag (CSA) to a vehicle rail or to a bracket coupled to the rail, when the mounting location is being shared by another vehicle component, such as a grip assist or garnish. The clips can be integrated into the CSA and allow the CSA to be positioned directly on the rail or on the brackets temporarily until such time as a more secure means is utilized, such as a threaded fastener. The clips allow access to an opening in the rail or bracket that is configured to receive a fastener that can be used to secure both the other component and the CSA to the rail or bracket. The clip thereby allows the CSA to be positioned on the vehicle rail without interfering with the subsequent attachment of the other component to the same mounting location on the rail or bracket. The fastener that attaches the other component to the rail or bracket also serves to secure the CSA to the rail or bracket. The clip remains attached to the rail or bracket and to the CSA. The clip facilitates the attachment of the CSA to the rail or bracket while still allowing for relatively easy alignment and attachment of another component, such as the grip assist or garnish.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

Figure 1:
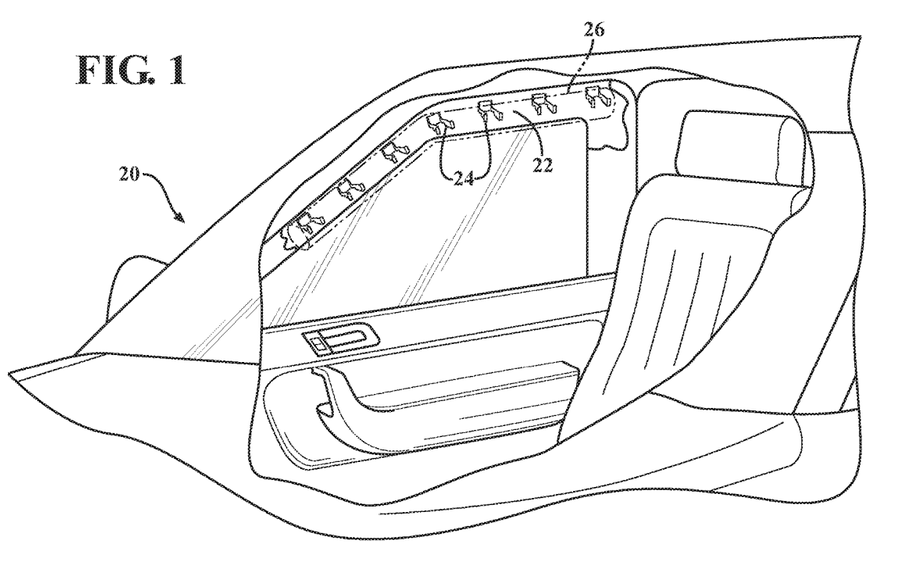
FIG. 1 is a portion of an example vehicle interior having a rail with multiple welded brackets thereon.
Figure 2:
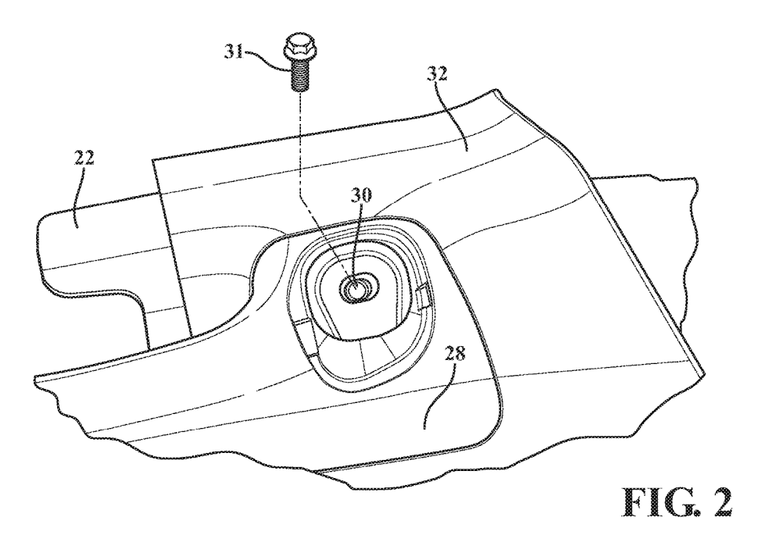
FIG. 2 is a fragmented view of an assist grip.

Referring to FIGS. 1-2, an exemplary vehicle 20 having a side rail 22 is illustrated. Side rail 22 may have a plurality of brackets 24 attached thereto, such as by welding. Brackets 24 may be utilized to attach components to vehicle 20, such as a curtain side airbag (CSA) 26 and a grip assist 28. Bracket 24 may have an opening 30 configured to receive a fastener 31, such as a threaded fastener. Trim pieces 32 can cover CSA 26 and rail 22 to provide a desired aesthetic appearance.

Figures 3, 4, 5:
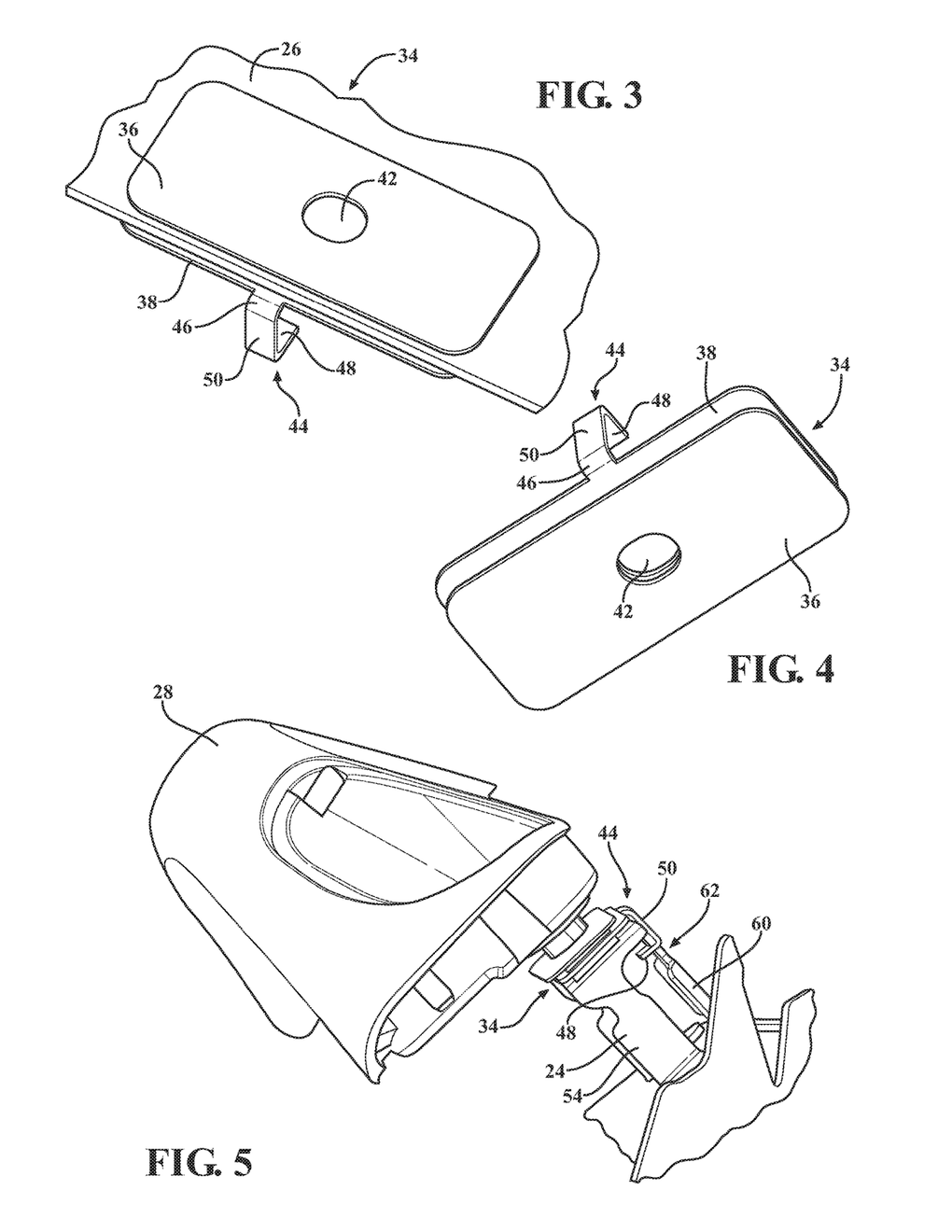
FIGS. 3 and 4 are perspective views of a first embodiment of a clip for a curtain side airbag that can be used share a side rail bracket with an assist grip.
FIGS. 5-7 are fragmented perspective views of an assist grip and the clip of FIGS. 3 and 4 attached to a side rail bracket.
Figure 6:
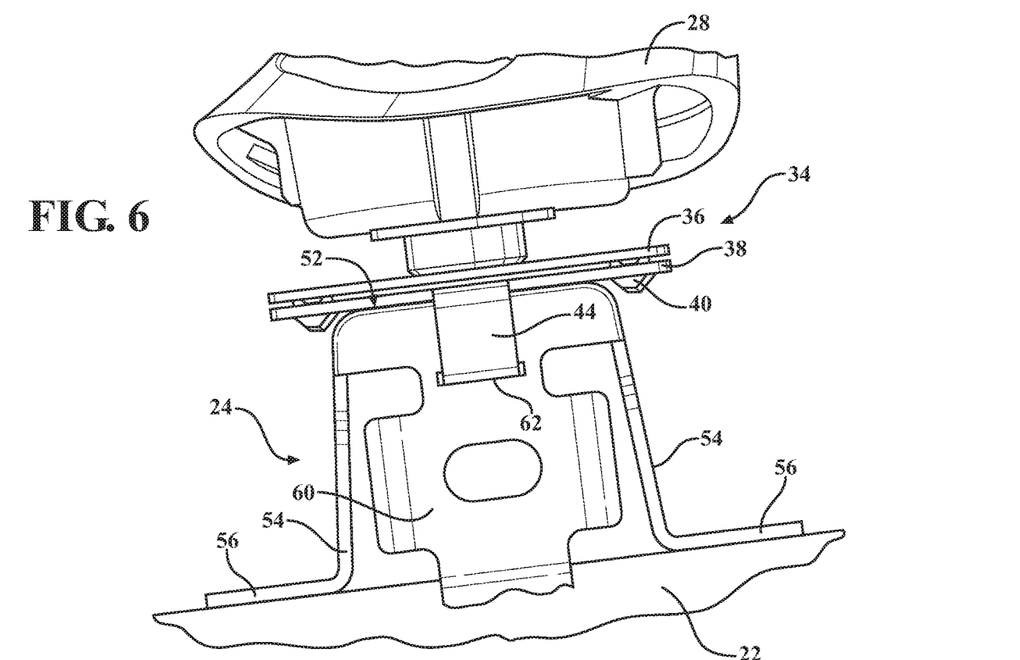
Figure 7:
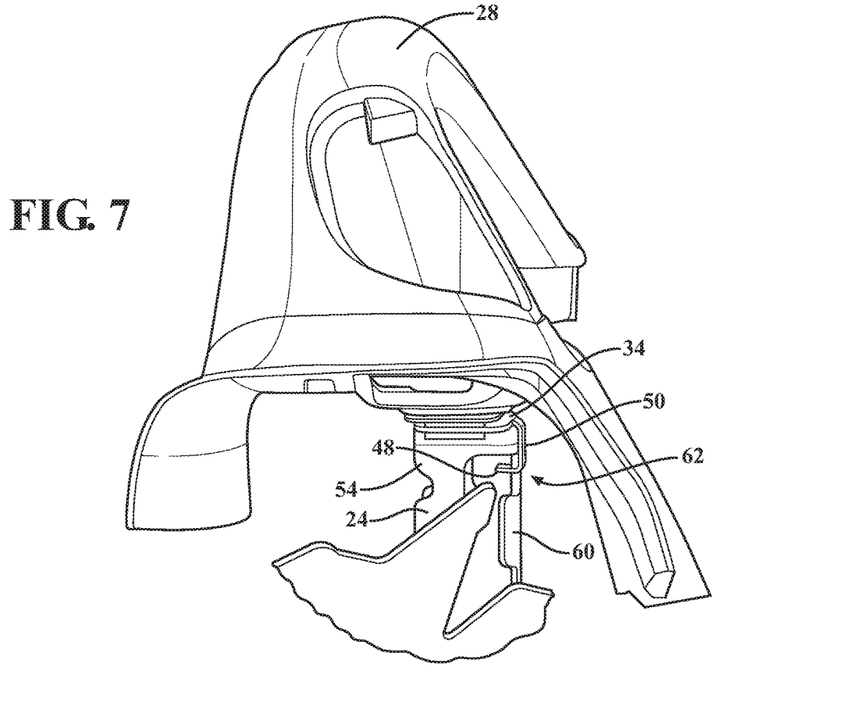
Figure 8:
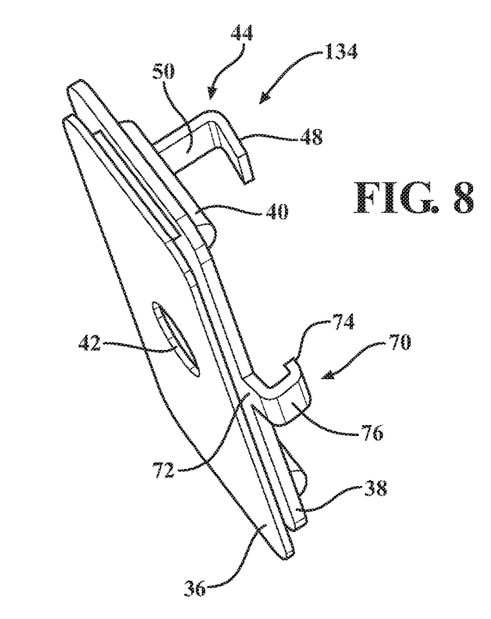
FIGS. 8-10 are perspective views of a second embodiment of a clip for a curtain side airbag that can be used share a side rail bracket with an assist grip.
Figure 9:
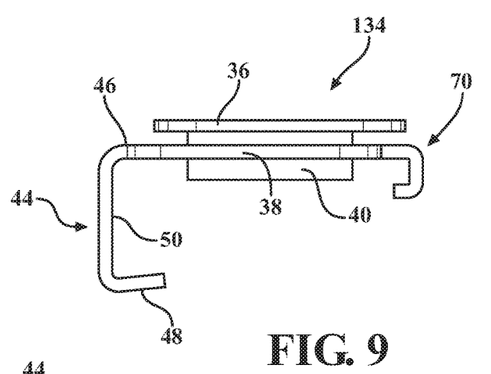
Figure 10:
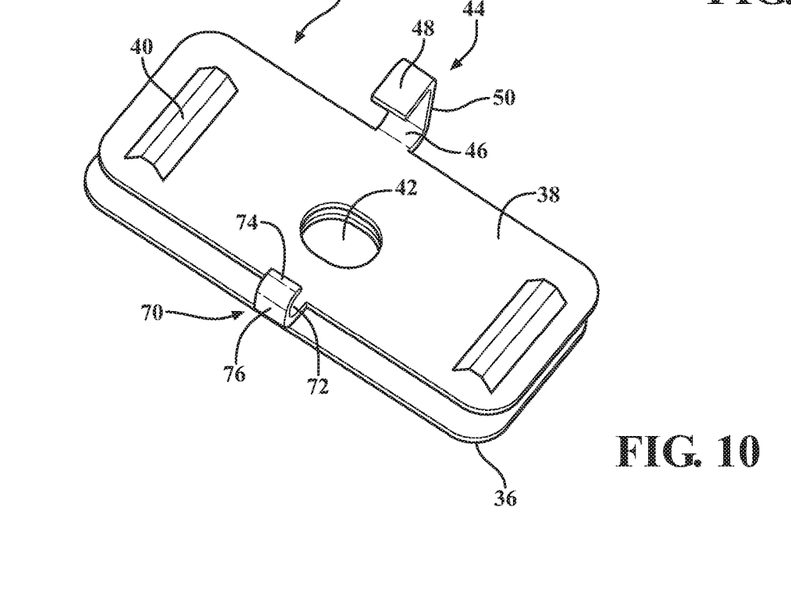
Figure 11:
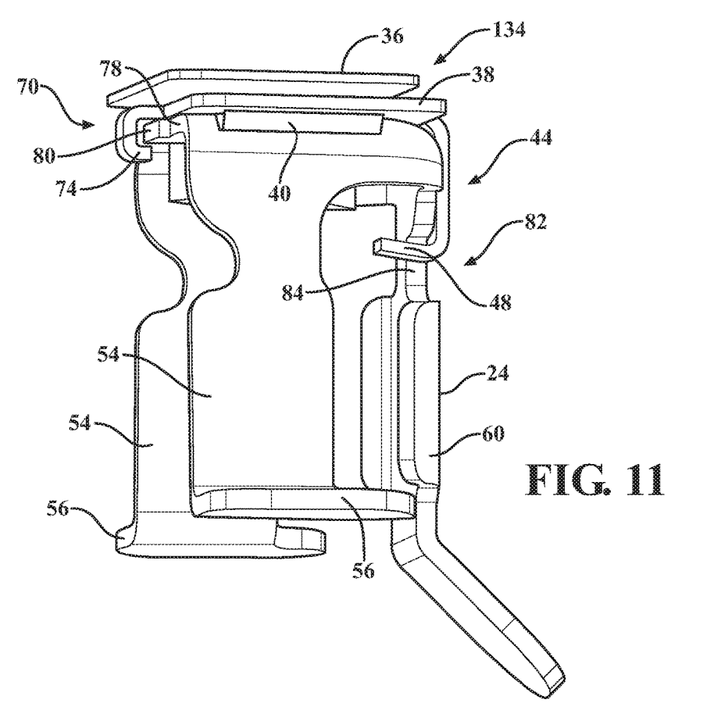
FIG. 11 is a perspective view of the clip of FIGS. 8-10 attached to a side rail bracket.

Referring to FIGS. 3-7, an exemplary clip 34 according to a first aspect of the present invention is shown. Clip 34 includes a top plate 36 and a lower plate 38. Clip 34 may be metal, plastic or any other suitable material or a combination of multiple materials. A portion of CSA 26, as shown in FIG. 3 only, is captured between plates 36, 38 in any well-known way, such as by fasteners 40 (FIG. 6). Each plate 36, 38 has an opening 42 that are aligned with each other. Openings 42 are configured to align with opening 30 in bracket 24 when affixed thereto. Lower plate 38 includes a hook portion 44 configured to allow clip 34 to be affixed to bracket 24. Hook portion 44 can take a variety of forms to accomplish affixing clip 34 to bracket 24. For example, hook portion 44 may include parallel upper and lower extensions 46, 48 spaced apart by wall 50. Lower extension 48 is a free end of hook portion 44.

Figure 12:
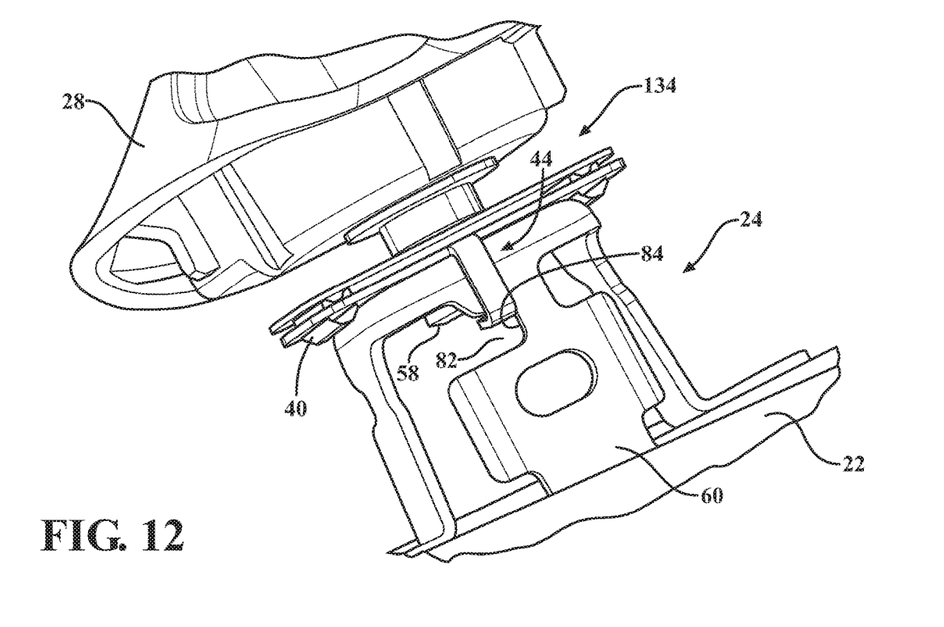
FIGS. 12-13 are fragmented perspective views of an assist grip and the clip of FIGS. 8-10 attached to a side rail bracket.
Figure 13:
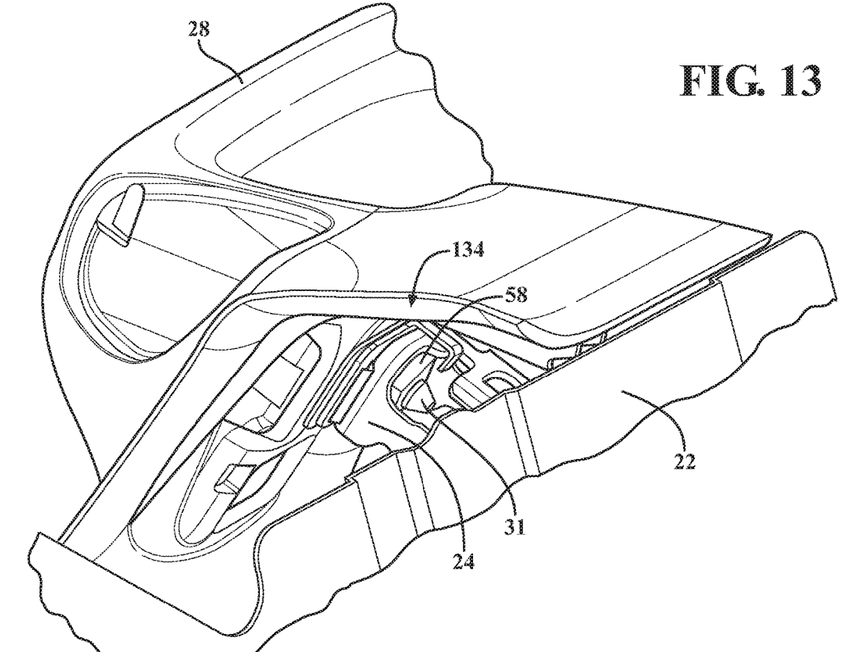
Figure 14:
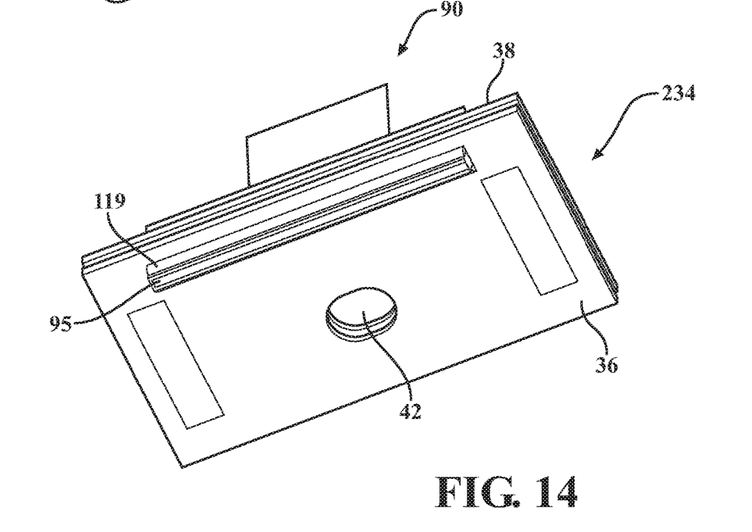
FIGS. 14-16 are perspective views of a third embodiment of a clip for a curtain side airbag that can be used share a side rail bracket with an assist grip.
Figure 15:
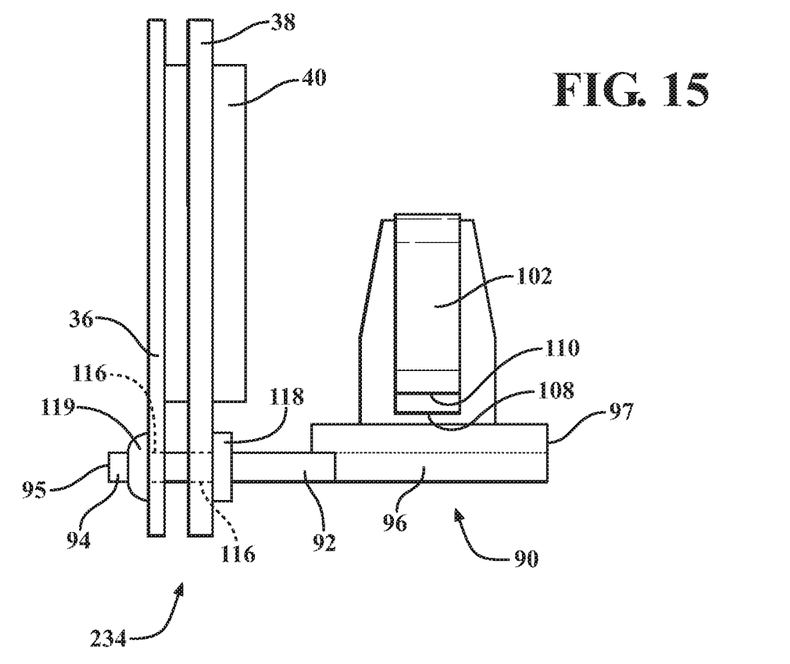
Figure 16:
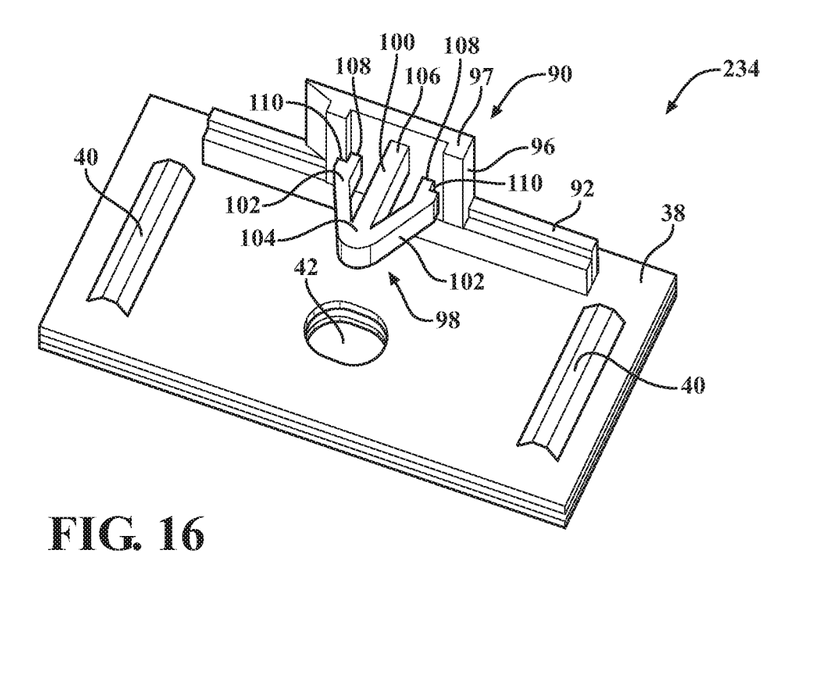
Figure 17:
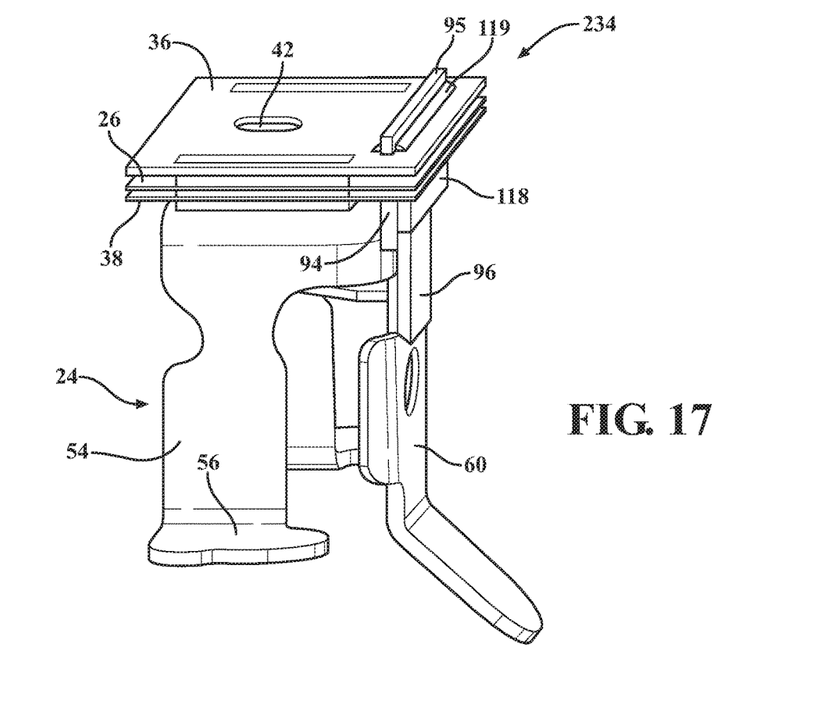
FIGS. 17-18 are perspective views of the clip of FIGS. 14-16 attached to a side rail bracket.
Figure 18:
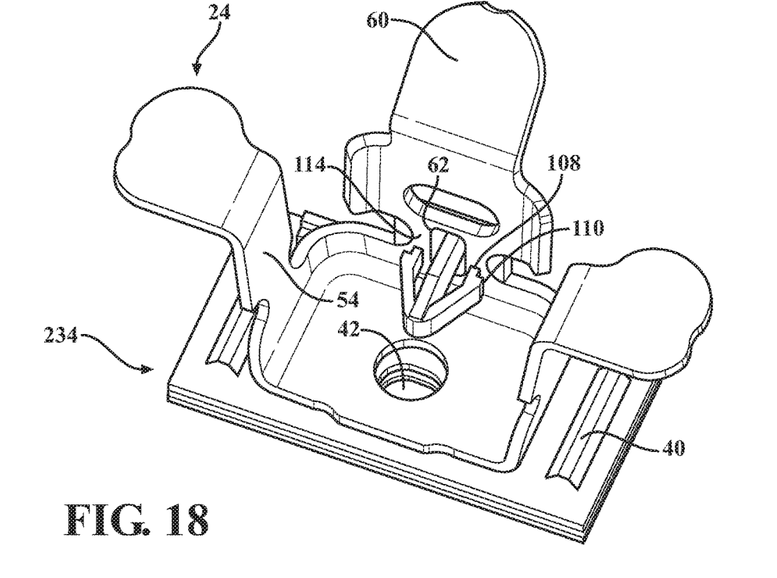

Bracket 24 may include an upper surface 52 from which a pair of side legs 54 may extend. Each leg 54 may include a foot 56 that is attached to rail 22, such as by welding. Opening 30 is in upper surface 52. Opening 30 may be a threaded opening to receive fastener 31. Alternatively, a threaded nut 58 (FIGS. 12-13 and 19) can be attached to the back side of upper surface 52 aligned with opening 30. Bracket 24 may include a third leg 60 extending from upper surface 52. Leg 60 may be attached to rail 22, such as by welding, or may be cantilevered from upper surface 52. Leg 60 is configured to receive hook portion 44 to allow clip 34 to be secured to bracket 24. For example, leg 60 may include a slot 62 sized and shaped to receive lower extension 48 of hook portion 44. Slot 62 may be configured on leg 60 such that when hook portion 44 is engaged therewith, opening 42 in clip 34 is aligned with opening 30 in bracket 24. Bracket 24 may be attached to rail 22 such that gravity aides in retaining clip 34 on bracket 24 when hook portion 44 is engaged with slot 62.

During assembly, clip 34 is affixed to bracket 24 via the engagement of hook portion 44 with slot 62. The worker can also affix any other clips to other brackets as needed, which may or may not utilize the same type of clip/bracket engagement. Once affixed to bracket 24, CSA 26 is temporarily held in place solely by the engagement of hook portion 44 with slot 62 and the aid of gravity. The worker can then align a grip assist 28 with bracket 24 and utilize a fastener 31 to more securely attached CSA 26 to bracket 24. Specifically, fastener 31 can be inserted through an opening in grip assist 28, openings 42 in clip 34 and opening 30 in bracket 24 and clamp grip assist 28 and CSA 26 to bracket 24. Clip 34 remains attached to bracket 24. The engagement between hook portion 44 and slot 62 thereby reduces and/or eliminates the need for the worker to physically hold CSA 26 in position during the attachment of another component, such as grip assist 28 to the same bracket 24.

Referring now to FIGS. 8-13, another exemplary clip 134 according to a second aspect of the present invention is shown. Clip 134 is similar to clip 34 and, as such, the same features will utilize the same reference numbers. Moreover, the similar structure and details may not be described further. Clip 134 may be metal, plastic or any other suitable material or a combination of multiple materials.

Clip 134 includes a second hook portion 70 to provide another engagement with bracket 24 for attachment to vehicle 20. Hook portion 70 extends from lower plate 38 and is configured to work in conjunction with hook portion 44 to allow clip 134 to be affixed to bracket 24. Hook portion 70 can take a variety of forms to accomplish affixing clip 134 to bracket 24. For example, hook portion 70 may include parallel upper and lower extensions 72, 74 spaced apart by a wall 76. Hook portion 70 may be smaller in size (as shown), larger in size or the same size as hook portion 44. Hook portion 70 can extend from lower plate 38 along an edge opposite that from which hook portion 44 extends. Hook portions 70 and 44 may be aligned with one another or offset as they extend from lower plate 38. Lower extension 74 is a free end of hook portion 70.

Hook portion 70 is configured to fit over the edge 78 of upper surface 52 opposite third leg 60 when clip 134 is attached to bracket 24. Bracket 24 may include a projection 80 along edge 78. Projection 80 can provide additional purchase for hook portion 70. Additionally, bracket 24 may include an open recess 82 in lieu of slot 62 to receive lower extension 48 of hook portion 44. Engagement between lower extension 48 and edge 84 of recess 82 can limit rotational movement of CSA 26 when coupled to bracket 24 with clip 134.

During assembly, clip 134 is affixed to bracket 24 via the engagement of hook portion 44 with recess 82 and engagement of hook portion 70 with projection 80. Specifically, a worker can slide clip 134 into engagement with bracket 24 from the open side of recess 82. Next, the worker can also affix any other clips to other brackets as needed, which may or may not utilize the same type of clip/bracket engagement. Once affixed to bracket 24, CSA 26 is temporarily held in place solely by the engagement of hook portion 44 with recess 82 and hook portion 70 with projection 80 and the aid of gravity. The use of two hook portions 44, 70 along with engagement with edge 84 may prevent rotation of CSA 26 on bracket 24 prior to attachment with fastener 31. The worker can then align a grip assist 28 with bracket 24 and utilize a fastener 31 to more securely attached CSA 26 to bracket 24. Specifically, fastener 31 can be inserted through an opening in grip assist 28, openings 42 in clip 134 and opening 30 in bracket 24 and clamp grip assist 28 and CSA 26 to bracket 24. Clip 134 remains attached to bracket 24. The engagement between hook portions 44, 70 and clip 134 thereby reduces and/or eliminates the need for the worker to physically hold CSA 26 in position during the attachment of another component, such as grip assist 28 to the same bracket 24.

Referring now to FIGS. 14-19, another exemplary clip 234 according to a third aspect of the present invention is shown. Clip 234 is similar to clip 34 and, as such, the same features will utilize the same reference numbers. Moreover, the similar structure and details may not be described further. Clip 234 may be metal, plastic or any other suitable material or a combination of multiple materials.

Clip 234 does not use hook portion 44. Rather, clip 234 includes a resilient connector 90 configured to be inserted into slot 62 of bracket 24. Connector 90 may be metal, plastic or any other suitable material or a combination of multiple materials. Connector 90 can take a variety of forms. For example, connector 90 may include a base 92 having an upper extension 94 with a top edge 95 and a lower extension 96 with a bottom edge 97. A resilient head 98 may extend from lower extension 96. Head 98 may include a stem 100 and a pair of resilient wings 102 extending from an end 104 thereof while the opposite end 106 of stem 100 extends from lower extension 96. Wings 102 may taper outwardly as they extend from end 104 toward lower extension 96. Free end 108 of each wing 102 may have a shoulder 110 adjacent each end 112. Head 98 is configured to be inserted into slot 62 with wings 102 resiliently flexing inward toward stem 100 during insertion. Head 98 is inserted until shoulders 110 and/or ends 108 have passed through slot 62 and wings 102 move outwardly away from stem 100 due to the resilient nature of wings 102. Shoulders 110 or ends 108 provide purchase against the back surface 114 of third leg 60 to inhibit removal of clip 234 from bracket 24.

Figure 19:
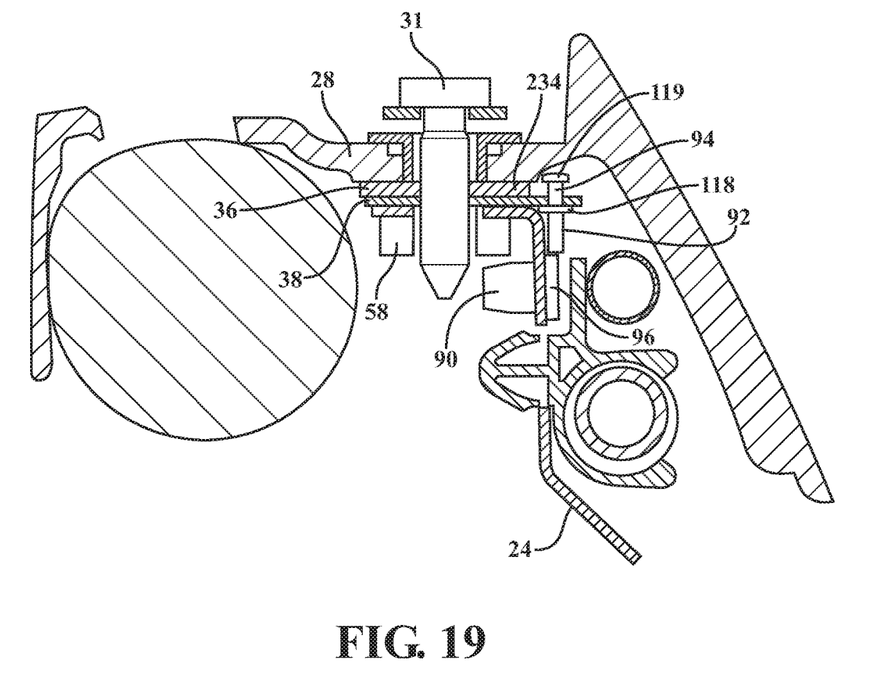
FIG. 19 is a cross-sectional view of an assist grip, a curtain side airbag and the clip of FIGS. 14-16 attached to a side rail bracket.

Connector 90 is attached to clip 234 by inserting upper extension 94 through corresponding openings 116 plates 36, 38 until a collar portion 118 engages with the surface of lower plate 38. Collar portion 118 may limit the degree to which upper extension 94 can be inserted through openings 116. End 95 of upper extension 94 may be deformed after passing through openings 116 to inhibit removal and secure connector 90 to clip 234. For example, upper extension 94 may be plastic and end 95 may be deformed by melting to create a head 119 that inhibits removal of upper extension 94 from openings 116. Head 119 and collar portion 118 may secure connector 90 to plates 36, 38. Alternatively, head 119 can be created by any other suitable means to deform end 95 based on the materials of construction of connector 90 and/or plates 36, 38. Additionally, connector 90 may be attached to clip 234 through an adhesive. Alternatively, connector 90 can be attached only to lower plate 38 by passing through an 118 on a portion of lower plate 38 that extends beyond an edge of upper plate 36, such as shown in FIG. 19.

During assembly, clip 234 is affixed to bracket 24 via the engagement of connector 90 with slot 62. Specifically, a worker can position clip 234 adjacent top plate 36 with head 98 aligned with slot 62. Head 98 can then be pushed through slot 62 so that wings 102 engage with back surface 114 of leg 62 and secure clip 234 to bracket 24. Next, the worker can also affix any other clips to other brackets as needed, which may or may not utilize the same type of clip/bracket engagement. Once affixed to bracket 24, CSA 26 is temporarily held in place solely by the engagement of connector 90 with slot 62 and the aid of gravity. The use of connector 90 may prevent rotation of CSA 26 on bracket 24 prior to attachment with fastener 31. The worker can then align a grip assist 28 with bracket 24 and utilize a fastener 31 to more securely attached CSA 26 to bracket 24. Specifically, fastener 31 can be inserted through an opening in grip assist 28, openings 42 in clip 234 and opening 30 in bracket 24 and clamp grip assist 28 and CSA 26 to bracket 24. Clip 234 remains attached to bracket 24. The engagement between connector 90 and clip 234 thereby reduces and/or eliminates the need for the worker to physically hold CSA 26 in position during the attachment of another component, such as grip assist 28 to the same bracket 24.

In some vehicles, brackets 24 may not be utilized. In this case, rail 22 will have other features that serve as the mounting locations for CSA 26 and the other vehicle components, such as grip assist 28, along with engagement features for the clip. For example, rail 22 may have threaded nut(s) 58 attached thereto to allow CSA 26 and other components, such as grip assist 28 or a garnish to be coupled to rail 22. Rail 22 will also include the appropriate slot 62, projection 80 and/or open recess 82 based on the particular clip 34, 134, 234 being utilized. In this manner a clip 34, 134, 234 may be attached to CSA 26 to allow CSA 26 to be affixed to rail 22 prior to utilizing fastener 31. Specifically, a worker can position CSA 26 on rail 22 by engaging the associated features of the clip and rail such that CSA 26 is temporarily held in place on rail 22 with opening 42 aligned with threaded nut 58. The worker can then align another component, such as grip assist 28 with rail 22 and utilize a fastener 31 to more securely attached CSA 26 to rail 22. Specifically, fastener 31 can be inserted through an opening in grip assist 28, openings 42 in clip 34,134,234 and clamp grip assist 28 and CSA 26 to rail 22. Clip 34,134, 234 remains attached to rail 22. The engagement between clip 34,134, 234 and rail 22 thereby reduces and/or eliminates the need for the worker to physically hold CSA 26 in position during the attachment of another component, such as grip assist 28, to the same mounting feature on rail 22.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention.

What is claimed is:

1. A system for attaching components to a vehicle, the system comprising:
   a fastener;
   an inflatable restraint;
   a clip operatively connected to the restraint, the clip having a retention feature and an opening, the retention feature comprising a first hook portion and a second hook portion;
   a bracket operatively connected to a vehicle side rail, the bracket having an opening and an engagement feature, wherein the engagement feature is configured to engage the retention feature with the first hook portion on the clip in an open recess on a leg of the bracket and to engage the second hook portion on the clip with a projection on an upper surface of the bracket;

wherein the retention feature engages with the engagement feature and retains the restraint coupled to the bracket with the openings aligned with one another without the use of the fastener; and wherein the fastener is subsequently inserted into the aligned openings and secures the restraint to the bracket along with the clip.

2. The system of claim 1, wherein the engagement feature is a second opening in the bracket and the retention feature engages with the engagement feature by insertion into the second opening.

3. The system of claim 2, wherein the first hook portion or the second hook portion which comprises a free end that is inserted into the second opening to retain the restraint coupled to the bracket without the use of the fastener.

4. The system of claim 2, wherein the retention feature comprises a connector with at least one resilient wing that deforms during insertion into the second opening to retain the restraint coupled to the bracket without the use of the fastener.

5. The system of claim 2, wherein the bracket further comprises an upper surface, the second opening is in the leg and the opening is in the upper surface.

6. The system of claim 1, wherein the bracket includes a first engagement feature and a second engagement features, the first engagement feature is an open recess along a leg of the bracket, the second engagement feature is a projection along an upper surface of the bracket, the retention feature engages with the first engagement feature and inhibits rotation of the restraint relative to the bracket, the retention feature engages with the second engagement feature, and engagement of the retention feature with the engagement features retains the restraint coupled to the bracket with the openings aligned with one another without the use of the fastener.

7. The system of claim 1, further comprising another vehicle component having an opening therein, the component being positioned on the bracket above the clip with component opening aligned with the clip opening and the bracket opening and wherein the fastener is inserted into the aligned openings and secures the component and the restraint to the bracket along with the clip.

8. A vehicle, comprising:
at least one side rail;
a bracket operatively connected to the side rail, the bracket having an opening and an engagement feature;
a vehicle component having an opening;
a fastener;
an inflatable restraint;
a clip operatively connected to the restraint, the clip having a retention feature and an opening, the retention feature comprising a first hook portion and a second hook portion;
wherein the retention feature engages with the engagement feature and retains the restraint operatively coupled to the side rail with the clip and mounting openings aligned with one another without the use of the fastener;
wherein the component opening is subsequently aligned with the clip and the mounting openings and the fastener is inserted into the aligned openings and secures the component and restraint to relative to the side rail along with the clip; and
wherein the engagement feature is configured to engage the retention feature with the first hook portion on the clip in an open recess on a leg of the bracket and to engage a second hook portion on the clip with a projection on an upper surface of the bracket.

9. The vehicle of claim 8, further comprising:
at least one bracket operatively connected to the side rail, the mounting opening and engagement feature being in the bracket; and
wherein the engagement feature is a second opening in the bracket and the retention feature engages with the engagement feature by insertion into the second opening.

10. The vehicle of claim 9, wherein the first hook portion or the second hook portion which comprises a free end that is inserted into the second opening to retain the restraint coupled to the bracket without the use of the fastener.

11. The vehicle of claim 9, wherein the retention feature comprises a connector with at least one resilient wing that deforms during insertion into the second opening to retain the restraint coupled to the bracket without the use of the fastener.

12. The vehicle of claim 9, wherein the bracket further comprises an upper surface, the second opening is in the leg and the opening is in the upper surface.

13. The vehicle of claim 8, further comprising:
at least one bracket operatively connected to the side rail, the mounting opening and engagement feature being in the bracket; and
wherein the bracket includes a first engagement feature and a second engagement features, the first engagement feature is an open recess along a leg of the bracket, the second engagement feature is a projection along an upper surface of the bracket, the retention feature engages with the first engagement feature and inhibits rotation of the restraint relative to the bracket, the retention feature engages with the second engagement feature, and engagement of the retention feature with the engagement features retains the restraint coupled to the bracket with the openings aligned with one another without the use of the fastener.

14. A method of attaching multiple components to a vehicle, the method comprising:
operatively connecting a bracket to a side rail, the bracket having an opening and an engagement feature;
operatively connecting a clip of an inflatable restraint to the bracket with an opening in the clip aligned with an opening in the bracket, the clip further having a retention feature, the retention feature comprising a first hook portion and a second hook portion, wherein the engagement feature of the bracket is configured to engage the retention feature with the first hook portion on the clip in an open recess on a leg of the bracket and to engage a second hook portion on the clip with a projection on an upper surface of the bracket;
maintaining the connection of the clip to the bracket without the use of a fastener;
aligning an opening in another vehicle component with the aligned openings in the clip and bracket;
inserting a fastener through the aligned openings; and
securing the component, the clip and the restraint to the bracket with the fastener.

15. The method of claim 14, wherein connecting the clip to the bracket includes engaging the retention feature of the clip with the engagement feature of the bracket, the engaging retaining the clip and the restraint on the bracket with the openings aligned and without the use of the fastener.

16. The method of claim 15, wherein engaging the retention feature with the engagement feature includes positioning the first hook portion or the second hook portion on the clip in a second opening in the leg of the bracket and retaining the clip and restraint on the bracket through gravity and the engagement of the retaining and engagement features.

17. The method of claim 15, further comprising inhibiting rotation of the dip and restraint relative to the bracket through the engagement of the first hook portion with the open recess.

18. The method of claim 15, wherein engaging the retention feature with the engagement feature includes inserting a connector having at least one deformable wing through a second opening in the bracket.

19. The method of claim 14, wherein the other vehicle component is a grip assist.

* * * * *

UNITED STATES PATENT AND TRADEMARK OFFICE
CERTIFICATE OF CORRECTION

PATENT NO. : 9,896,054 B2  
APPLICATION NO. : 15/008703  
DATED : February 20, 2018  
INVENTOR(S) : Nora Arellano Page 1 of 1

It is certified that error appears in the above-identified patent and that said Letters Patent is hereby corrected as shown below:

In the Claims

Claim 17, Column 9, Line 11: delete "dip" and insert --clip--.

Signed and Sealed this  
Twenty-sixth Day of March, 2019

Andrei Iancu  
*Director of the United States Patent and Trademark Office*